(12) United States Patent
Yang et al.

(10) Patent No.: US 12,500,309 B2
(45) Date of Patent: Dec. 16, 2025

(54) BATTERY PACK AND DEVICE

(71) Applicant: CONTEMPORARY AMPEREX TECHNOLOGY (HONG KONG) LIMITED, Hong Kong (CN)

(72) Inventors: Haiqi Yang, Ningde (CN); Xingyuan Wu, Ningde (CN); Minjie Zheng, Ningde (CN); Jiarong Hong, Ningde (CN); Langchao Hu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 658 days.

(21) Appl. No.: 17/489,281

(22) Filed: Sep. 29, 2021

(65) Prior Publication Data
US 2022/0021070 A1 Jan. 20, 2022

Related U.S. Application Data

(63) Continuation of application No. PCT/CN2020/135947, filed on Dec. 11, 2020.

(30) Foreign Application Priority Data

Feb. 21, 2020 (CN) .......................... 202020192138.7

(51) Int. Cl.
*H01M 50/325* (2021.01)
*H01M 10/613* (2014.01)
(Continued)

(52) U.S. Cl.
CPC ....... *H01M 50/325* (2021.01); *H01M 10/613* (2015.04); *H01M 10/625* (2015.04);
(Continued)

(58) Field of Classification Search
CPC ............. H01M 50/325; H01M 50/204; H01M 50/249; H01M 50/358; H01M 10/613;
(Continued)

(56) References Cited

U.S. PATENT DOCUMENTS 10,601,090 B2 3/2020 Newman et al.
2014/0322566 A1* 10/2014 Kim .................... H01M 50/271
429/82

(Continued)

FOREIGN PATENT DOCUMENTS

CN 207977389 * 10/2018 ............. Y02E 60/10
CN 209071461 U 7/2019
(Continued)

OTHER PUBLICATIONS

English Translation of CN207977389.*
(Continued)

*Primary Examiner* — Kiran Quraishi Akhtar
(74) *Attorney, Agent, or Firm* — Scully, Scott, Murphy & Presser, P.C.

(57) ABSTRACT

An embodiment of the present application provides a battery pack and a device. The battery pack includes a battery module, a heat exchange member, a flow guide piece and a heat-conducting connecting piece. The battery module includes a plurality of batteries. Each battery is provided with an explosion-proof valve. The heat exchange member includes a heat exchange plate. The heat exchange plate is connected to the plurality of batteries through the heat-conducting connecting piece, and the heat exchange plate at least partially covers each explosion-proof valve. The flow guide piece is arranged between the plurality of batteries and the heat exchange plate, the flow guide piece is provided with a positioning hole penetrating in a height direction of the battery pack, and the positioning hole exposes the
(Continued)

corresponding explosion-proof valve. The flow guide piece separates the corresponding explosion-proof valve from the heat-conducting connecting piece.

14 Claims, 6 Drawing Sheets

(51) Int. Cl.
*H01M 10/625* (2014.01)
*H01M 10/6556* (2014.01)
*H01M 50/204* (2021.01)
*H01M 50/249* (2021.01)

(52) U.S. Cl.
CPC ..... *H01M 10/6556* (2015.04); *H01M 50/204* (2021.01); *H01M 50/249* (2021.01); *H01M 2200/20* (2013.01); *H01M 2220/20* (2013.01)

(58) Field of Classification Search
CPC ........... H01M 10/625; H01M 10/6556; H01M 10/653; H01M 10/6554; H01M 10/6567; H01M 2200/20; H01M 2220/20; Y02E 60/10
See application file for complete search history.

(56) References Cited

U.S. PATENT DOCUMENTS

| | | | |
|---|---|---|---|
| 2015/0214525 | A1 | 7/2015 | Lim |
| 2018/0316071 | A1 | 11/2018 | Newman et al. |
| 2020/0212526 | A1 | 7/2020 | Wu et al. |
| 2021/0296721 | A1* | 9/2021 | Omura ................ H01M 50/227 |

FOREIGN PATENT DOCUMENTS

| | | | | |
|---|---|---|---|---|
| CN | 209401677 U | | 9/2019 | |
| CN | 211376746 U | | 8/2020 | |
| WO | 2020026973 A1 | | 2/2020 | |
| WO | WO2020026973 | * | 2/2020 | .......... H01M 10/653 |

OTHER PUBLICATIONS

International Search Report dated Mar. 3, 2021 issued in PCT/CN2020/135947.

Extended European Search report dated Oct. 31, 2022 received in European patent Application No. EP 20919678.1.

* cited by examiner

BATTERY PACK AND DEVICE

CROSS-REFERENCE TO RELATED APPLICATIONS

The present application is a continuation of International Application No. PCT/CN2020/135947, filed on Dec. 11, 2020, which claims priority to Chinese Patent Application No. 202020192138.7, filed on Feb. 21, 2020, titled "BATTERY PACK AND DEVICE", the entire contents of which are incorporated herein by reference.

TECHNICAL FIELD

An embodiment of the present application relates to the field of power batteries, and more particularly, to a battery pack and a device.

BACKGROUND

With the development of devices such as a power battery vehicle using a secondary battery as a power supply, the safety of a power battery system has gotten more and more attention and is an important factor affecting the development of the electric vehicle industry. In order to avoid thermal runaway, a heat exchange plate containing a heat exchange medium is arranged on the battery, high temperature gas and/or flame ejected by an explosion-proof valve melt through the heat exchange plate, and the heat exchange medium in the heat exchange plate flows into the explosion-proof valve. Whether the thermal runaway of the battery spreads is an important index to evaluate whether the battery system is safe. At present, the thermal runaway of the battery cannot be effectively prevented from spreading.

SUMMARY

In view of defects in the prior art, an objective of the present application is to provide a battery pack and a device, which can effectively prevent the thermal runaway of the battery from spreading.

To achieve the above objective, on one hand, the present application provides a battery pack. The battery pack includes a battery module, a heat exchange member, a flow guide piece and a heat-conducting connecting piece, where the battery module includes a plurality of batteries; each battery is provided with an explosion-proof valve; the heat exchange member includes a heat exchange plate; the heat exchange plate is connected to the plurality of batteries through the heat-conducting connecting piece, and the heat exchange plate at least partially covers each explosion-proof valve; the flow guide piece is arranged between the plurality of batteries and the heat exchange plate, the flow guide piece is provided with a positioning hole penetrating along a height direction of the battery pack, and the positioning hole exposes the corresponding explosion-proof valve; and the flow guide piece separates the corresponding explosion-proof valve from the heat-conducting connecting piece.

The flow guide piece arranged in the present application can prevent the heat-conducting connecting piece from gathering or covering the explosion-proof valve of the battery so as to prevent the heat-conducing connecting piece from blocking the explosion-proof valve from being opened when the battery is subjected to thermal runaway.

In one embodiment, a plurality of positioning holes are provided, the plurality of positioning holes are arranged at intervals along a length direction of the battery pack, and each positioning hole corresponds to the respective explosion-proof valve.

The setting of positioning hole may expose the corresponding explosion-proof valve.

In one embodiment, the heat exchange plate includes a first heat exchange plate and a second heat exchange plate; the first heat exchange plate and the second heat exchange plate are arranged at intervals along a width direction of the battery pack, and each explosion-proof valve is covered with the first heat exchange plate and the second heat exchange plate at the same time; the flow guide piece is provided with an obstructing block; and the obstructing block is arranged between two adjacent positioning holes, and the obstructing block is positioned between the first heat exchange plate and the second heat exchange plate.

Both the first heat exchange plate and the second heat exchange plate are internally provided with heat exchange mediums with fire-extinguishing and cooling functions. Under the obstruction of the obstructing block, the heat exchange medium can gather at the position where the thermal runaway occurs, and the heat exchange mediums are controlled between the adjacent obstructing blocks, so that more heat exchange mediums enter the battery through the explosion-proof valve at the position where the thermal runaway occurs to rapidly cool the battery and extinguishes flame when accompanied with a flame, and the heat exchange mediums are prevented from spreading to other batteries, thereby improving heat exchange efficiency.

In one embodiment, the obstructing block is protruded from the first heat exchange plate and the second heat exchange plate in the height direction of the battery pack.

The obstructing block is protruded from the first heat exchange plate and the second heat exchange plate so as to obstruct the heat exchange mediums leaking out from the heat exchange plate from spreading to a position deviating from the thermal runaway when the battery is subjected to thermal runaway, so that more heat exchange mediums flow into the open explosion-proof valve and the thermal runaway of the battery is effectively prevented from spreading.

In one embodiment, the obstructing block abuts against a side wall of the first heat exchange plate and a side wall of the second heat exchange plate.

The obstructing block abuts against the side wall of the first heat exchange plate and the side wall of the second heat exchange plate so as to control the heat exchange mediums between the adjacent obstructing blocks when the battery is subjected to thermal runaway and completely obstruct the spreading of the heat exchange mediums.

In one embodiment, the flow guide piece is provided with a groove, the groove is separated from the positioning hole, and at least part the heat-conducting connecting piece is positioned in the groove.

A heat-conducting adhesive spreads into the groove after being extruded by the heat exchange plate, thereby preventing the heat-conducting adhesive from gathering to the explosion-proof valve of the battery after being extruded, further preventing the heat-conducting adhesive from affecting the opening of the explosion-proof valve during thermal runaway and effectively preventing the thermal runaway of the battery from spreading.

In one embodiment, the flow guide piece includes a main body portion and a connecting portions, where are a plurality of main body portions are provided, and the connecting portion is connected between two adjacent main body portions; the plurality of main body portions are arranged corresponding to the plurality of batteries respectively; the plurality of positioning holes are provided on the plurality of main body portions respectively; and the obstructing block is arranged on the connecting portion.

In one embodiment, the groove is formed at an outer side of the connecting portion.

In one embodiment, a size of the groove in a length direction of the battery pack gradually decreases along a direction closed to the connecting portion.

The size of the groove in the length direction of the battery pack gradually decreases along the direction closed to the connecting portion, so that the heat-conducting adhesive successfully enters the groove after being extruded. Meanwhile, the contact area of the heat-conducting adhesive and the heat exchange plate can be ensured, so that the connecting strength is improved.

In one embodiment, the heat-conducting connecting piece is a heat-conducting rubber plate.

The heat-conducting rubber plate has high heat transfer efficiency and facilitates adhesion of the heat exchange plate and the battery.

To achieve the above objective, on the other hand, the present application provides a device. The device includes the above battery pack. The battery pack is configured to provide electric energy.

The flow guide piece arranged in the battery pack described above can prevent the heat-conducting connecting piece from gathering or covering the explosion-proof valve of the battery so as to prevent the heat-conducing connecting piece from blocking the explosion-proof valve from being opened when the battery is subjected to thermal runaway. It is ensured that high-temperature and high-pressure gas can successfully break through the explosion-proof valve to damage the heat exchange plate when the battery is subjected to thermal runaway, so that a heat exchange medium can pass through the explosion-proof valve to successfully enter the battery after leaking out from the heat exchange plate, thereby cooling the battery, preventing combustion, reducing the influence on the adjacent battery by the battery subjected to thermal runaway, achieving the effect of blocking heat diffusion and effectively preventing thermal runaway of the battery from spreading.

BRIEF DESCRIPTION OF THE DRAWINGS

In order to describe technical solutions in embodiments of the present application more clearly, the accompanying drawings to be used for the embodiments or the present application will be introduced briefly. Obviously, the accompanying drawings to be described below are merely some embodiments of the present application, and a person of ordinary skill in the art may obtain other drawings according to these drawings without paying any creative effort.

Figure 1:
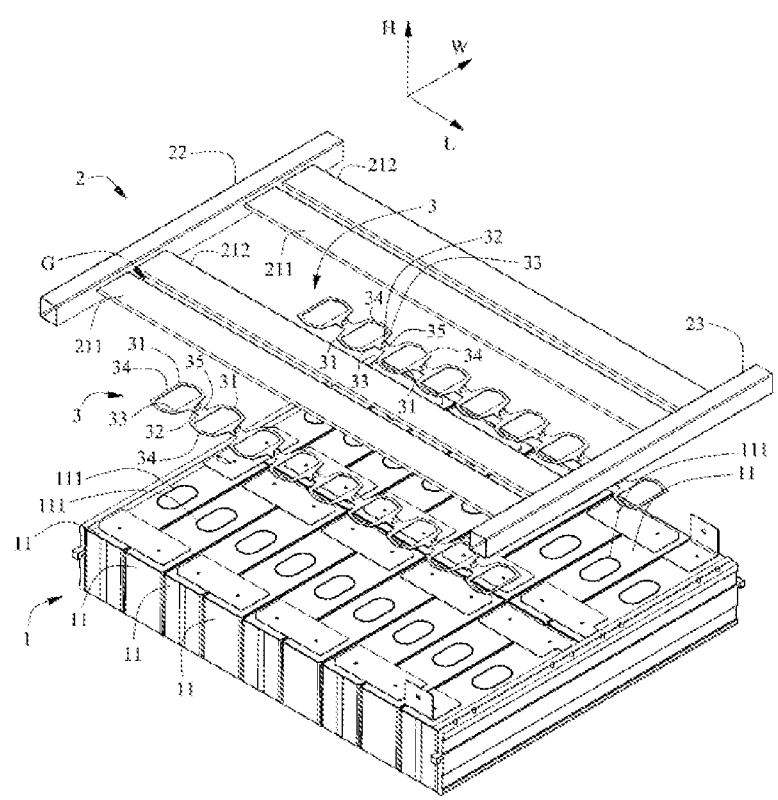
FIG. 1 is an exploded stereogram of a battery pack according to an embodiment of the present application.

In the accompanying drawings, the accompanying drawings are not drawn according to an actual ratio.

Among those, the reference signs are as follows:

| | |
|---|---|
| 1 | battery module |
| 11 | battery |
| 111 | explosion-proof valve |
| 2 | heat exchange member |
| 21 | heat exchange plate |
| 211 | first heat exchange plate |
| 212 | second heat exchange plate |
| 22 | first flow guide tube |
| 23 | second flow guide tube |
| 3 | flow guide piece |
| 31 | positioning hole |
| 32 | obstructing block |
| 33 | groove |
| 34 | main body portion |
| 35 | connecting portion |
| 4 | heat-conducting connecting piece |
| L | length direction |
| H | height direction |
| W | width direction |

DESCRIPTION OF EMBODIMENTS

The accompanying drawings show embodiments of the present application. It should be understood that the disclosed embodiments are only examples of the present application, and the present application may be implemented in various forms. Therefore, the specific details disclosed herein should not be interpreted as limitation, but only serves as a basis of the claims and as an indicative basis for teaching those of ordinary skill in the art to implement the present application in various ways.

In the description of the present application, it should be noted that "a plurality" means more than two; orientations or position relationships indicated by terms "upper", "lower", "left", "right", "inner", "outer", etc. are only used to facilitate description of the present application and simplify the description, but not to indicate or imply that the mentioned device or elements must have a specific orientation and must be constructed and operated in a specific orientation, and thus, these terms cannot be understood as a limitation to the present application. Moreover, terms like "first", "second", "third" etc. are only used for description, and cannot be considered as a indicating or implying relative importance. "Vertical" is not strictly vertical, but within the allowable range of error. "Parallel" is not strictly parallel, but within the allowable range of error.

Orientation words appearing the following description are all directions shown in the drawings, and do not limit a specific structure of the present application. In the description of the present application, it should also be noted that unless otherwise specified and limited, the terms "mounting", "connecting" and "connection" should be understood in a broad sense, for example, they may be fixed connection and may also be detachable connection or integrated connection; and they may be direct connection and may also be indirect connection through an intermediate medium. A person of ordinary skill in the art may understand specific meanings of the above-mentioned terms in the present application based on the specific situation.

The present application is further described in detail below with reference to specific embodiments and the accompanying drawings.

The device according to the embodiment of the present application refers to a device using the battery pack provided by the embodiment of the present application as a power supply, where the battery pack is configured to provide electric energy. The device includes a main body and the battery pack according to the embodiment of the present application, where the battery pack is arranged in the main body. The device may be a steamship, a vehicle and the like. The vehicle is a new energy vehicle, which may be a battery electric vehicle and may also be a hybrid electric vehicle or an extended-range vehicle. The main body of the vehicle is provided with a driving motor, the driving motor is electrically connected to the battery pack, the battery provides electric energy, and the driving motor is connected to wheels on the main body of the vehicle through a transmission mechanism so as to drive the vehicle to travel. In addition, the battery pack may also be used in an energy storage electric cabinet for providing electric energy.

Figure 2:
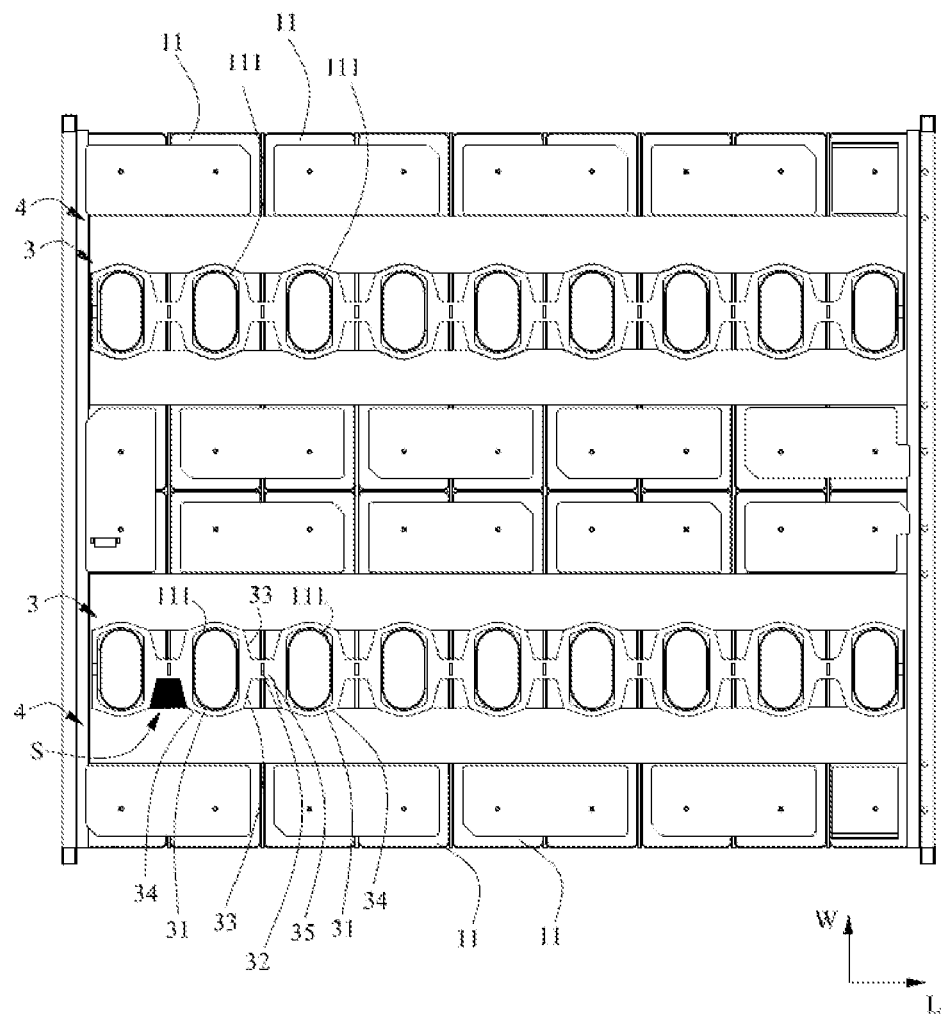
FIG. 2 is a planar graph that a flow guide piece and a heat-conducting connecting piece of the battery pack according to FIG. 1 are arranged in a battery module.
Figure 3:
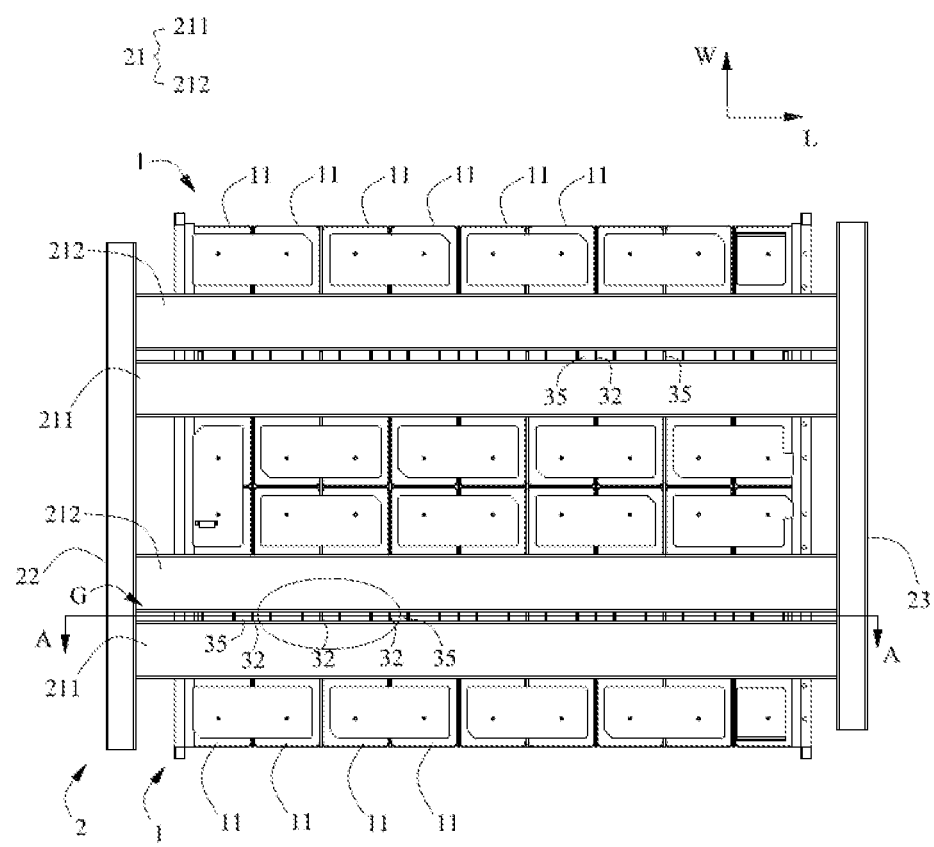
FIG. 3 is a planar graph of a battery pack according to an embodiment of the present application.

Referring to examples shown in FIG. 1 to FIG. 3, the battery pack in the embodiment of the present application includes a battery module 1, a heat exchange member 2, a flow guide piece 3 and a heat-conducting connecting piece 4.

The battery module 1 may be accommodated in a box body (not shown). The number of the battery module 1 may be one or more, and a plurality of battery modules 1 are arranged in the box body. The type of the box body is not limited, and the box body may be a frame-shaped box body, a disk-shaped box body or a box-shaped box body. The box body may include a lower box body for accommodating the battery module 1 and an upper box body covering the lower box body.

As shown in FIG. 1, the battery module 1 includes a plurality of batteries 11. Each battery 11 is provided with an explosion-proof valve 111. The plurality of batteries 11 are arranged sequentially along a length direction L of the battery pack. Each battery is a hard shell battery (or called a can-shaped battery). The hard shell battery includes an electrode assembly, a shell, a top cover, an electrode terminal, an explosion valve 111, a liquid injecting hole and the like. An accommodating cavity is formed in the shell so as to accommodate the electrode assembly and electrolyte. The electrode assembly includes a positive electrode sheet, a negative electrode sheet, and a separator for separating the positive electrode sheet from the negative electrode sheet.

As shown in FIG. 1 to FIG. 3, the heat exchange member 2 includes a heat exchange plate 21. The heat exchange plate 21 is connected to the plurality of batteries 11 through the heat-conducting connecting piece 4, and the heat exchange plate 21 at least partially covers each explosion-proof valve 111. The flow guide piece 3 is arranged between the plurality of batteries 11 and the heat exchange plate 21. Furthermore, the flow guide piece 3 is provided with a positioning hole 31 penetrating along a height direction H of the battery pack. The positioning hole 31 exposes the corresponding explosion-proof valve 111. The flow guide piece 3 separates the corresponding explosion-proof valve 111 from the heat-conducting connecting piece 4. The heat exchange plate 21 may completely cover each explosion-proof valve 111. However, considering the safety of the battery pack, gas in the battery 11 is discharged out of the explosion-proof valve 111 successfully, so that the explosion danger caused by the fact that gas cannot be discharged due to excessive pressure in the battery 11 is avoided. Optionally, the heat exchange plate 21 partially covers each explosion-proof valve 111. The heat exchange plate 21 is internally provided with a heat exchange medium, and the heat exchange medium has fire-extinguishing and cooling functions. A size of the positioning hole 31 is not less than a size of the explosion-proof valve 111, so that the explosion-proof valve 111 is completely exposed. When any battery 11 is subjected to thermal runaway, the heat exchange plate 21 can be broken to release the heat exchange medium, so that the heat exchange medium flows into the explosion-proof valve 111 of the battery 11. That is, high-temperature and high-pressure gas generated in the battery 11 breaks through the explosion-proof valve 111 and is released from the battery 11, where the high-temperature gas rushing out of the explosion-proof valve 111 may be accompanied with flame and may also be doped with high-temperature electrolyte; and the high-temperature and high-pressure gas will melt through the heat exchange plate 21, so that the heat exchange medium will leak out to enter the open explosion-proof valve 111. When the heat exchange plate 21 and the flow guide piece 3 are mounted, the flow guide piece 3 is placed on the battery 11 to enable the positioning hole 31 to expose the corresponding explosion-proof valve 111, then the heat-conducting connecting piece 4 is arranged at the top of the battery 11 through mounting or coating, finally the heat exchange plate 21 is placed at the top of the battery 11, and the heat-conducting connecting piece 4 is adhered between the top of the battery 11 and the heat exchange plat 21, so that assembling of the heat-conducting plate 21 and the battery module 1 is completed. The setting of flow guide piece 3 can prevent the heat-conducting connecting piece 4 from gathering or covering the explosion-proof valve 111 of the battery 11 so as to prevent the heat-conducing connecting piece 4 from blocking the explosion-proof valve 111 from being opened when the battery 11 is subjected to thermal runaway. The high-temperature and high-pressure gas can successfully break through the explosion-proof valve 111 to damage the heat exchange plate 21 when the battery 11 is subjected to thermal runaway, so that a heat exchange medium can pass through the explosion-proof valve 111 to successfully enter the battery 11 after leaking out from the heat exchange plate 21, thereby cooling the battery 11, preventing combustion, reducing the influence on the adjacent battery 11 by the battery 11 subjected to thermal runaway, achieving the effect of blocking heat diffusion and effectively preventing thermal runaway of the battery from spreading. The flow guide piece 3 may adhere to the battery 11 by using adhesive such as a double-sided adhesive tape, so that displacement of the flow guide piece 3 is avoided. The heat exchange medium may adopt any appropriate type with flame-resistant and cooling properties, such as water or water added with a flame retardant or liquid except for water.

As shown in FIG. 1, in some embodiments, the heat exchange member 2 may further include a first flow guide tube 22 and a second flow guide tube 23. A plurality of battery modules 1, a plurality of heat exchange plates 21 are provided correspondingly, and the plurality of heat exchange plates 21 are communicated between the first flow guide tube 22 and the second flow guide tube 23, so that heat management among the plurality of heat exchange plates 21 is realized. The plurality of heat exchange plates 21 are connected to a liquid conveying pump through the first flow guide tube 22 and the second flow guide tube 23, so that the heat exchange medium flow in and out and internal circulation can be realized.

The flow guide piece 3 is a plastic piece. Depending on the actual situation, one positioning hole 31 of the flow guide piece 3 may be provided, so that one flow guide piece 3 corresponds to the explosion-proof valve 111 of one battery 11. In the example shown in FIG. 1, a plurality of positioning holes 31 may be provided, the plurality of positioning holes 31 are arranged at intervals along a length direction L of the battery pack, and each positioning hole 31 corresponds to the respective explosion-proof valve 111. That is, one flow guide piece 3 corresponds to the explosion-proof valves 111 of a plurality of batteries 11, so that the assembling efficiency of the flow guide piece 3 is improved; meanwhile, the overall connecting strength can be ensured. Optionally, one battery module 1 is provided with one flow guide piece 3, so that the mounting efficiency can be greatly improved.

As shown in FIG. 2 and FIG. 3, in some embodiments, an obstructing block 32 is arranged on the flow guide piece 3. The heat exchange plate 21 includes a first heat exchange plate 211 and a second heat exchange plate 212. The first heat exchange plate 211 and the second heat exchange plate 212 are arranged at intervals along a width direction W of the battery pack, and each explosion-proof valve 111 is covered with the first heat exchange plate 211 and second heat exchange plate 212 at the same time. Both the first heat exchange plate 211 and the second heat exchange plate 212 are internally provided with heat exchange mediums with fire-extinguishing and cooling functions. The obstructing block 32 is arranged between two adjacent positioning holes 31, and the obstructing block 32 is positioned between the first heat exchange plate 211 and the second heat exchange plate 212. When the first heat exchange plate 211, the second heat exchange plate 212 and the flow guide piece 3 are mounted, firstly, the flow guide piece 3 is placed on the battery 11 to enable the positioning hole 31 to expose the corresponding explosion-proof valve 111, then the heat-conducting piece 4 is arranged at the top of the battery 11 through mounting or coating, finally, the first heat exchange plate 211 and the second heat exchange plate 212 are placed at the top of the battery 11, so that the first heat exchange plate 211 and the second heat exchange plate 212 cover each explosion-proof valve 111 at the same time, and the heat-conducting connecting piece 4 is adhered between the top of the battery 11 and the first heat exchange plate 211 and the second heat exchange plate 212. After the heat exchange plate 21, the flow guide piece 3 and the battery module 1 are mounted and when the battery 11 is subjected to thermal runaway, the first heat exchange plate 211, the first heat exchange plate 211 and/or the second heat exchange plate 212 are molten by high-temperature and high-pressure gas ejected from the explosion-proof valve 111, and the heat exchange medium leaks out. Under the obstruction of the obstructing block 32, the heat exchange medium can gather at the position where the thermal runaway occurs, and the heat exchange mediums are controlled between the adjacent obstructing blocks 32, so that more heat exchange mediums enter the battery 11 through the explosion-proof valve 111 at the position where the thermal runaway occurs to rapidly cool the battery 11 and extinguishes flame when accompanied with a flame, and the heat exchange mediums are prevented from spreading to other batteries 11, thereby improving heat exchange efficiency.

Figure 4:
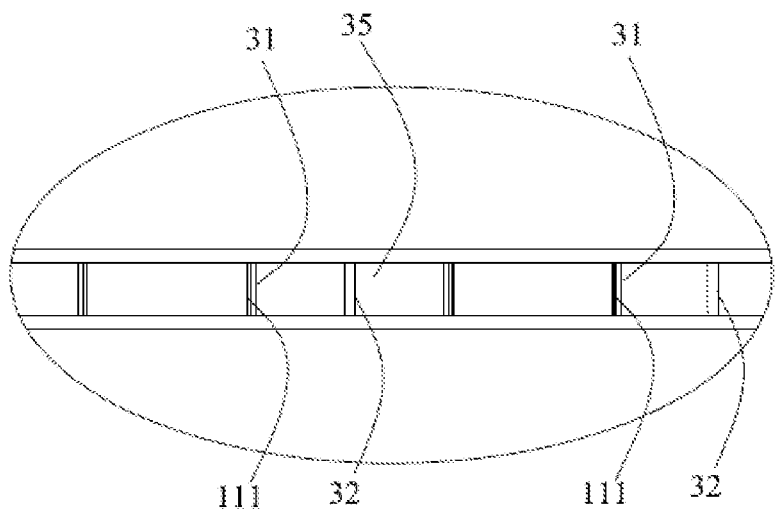
FIG. 4 is an enlarged view of a circle part in FIG. 3.

Referring to the examples shown in FIG. 3 and FIG. 4, the obstructing block 32 abuts against the side wall of the first heat exchange plate 211 and the side wall of the second heat exchange plate 212 so as to control the heat exchange mediums between the adjacent obstructing blocks 32 when the battery 11 is subjected to thermal runaway and completely obstruct the spreading of the heat exchange mediums.

Figure 5:
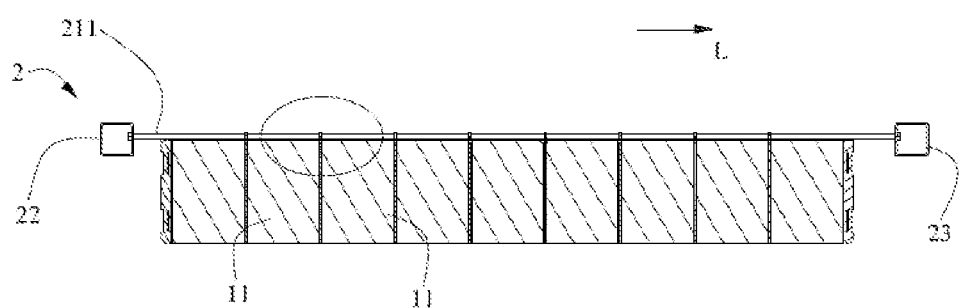
FIG. 5 is a sectional view drawn along a line A-A in FIG. 3.
Figure 6:
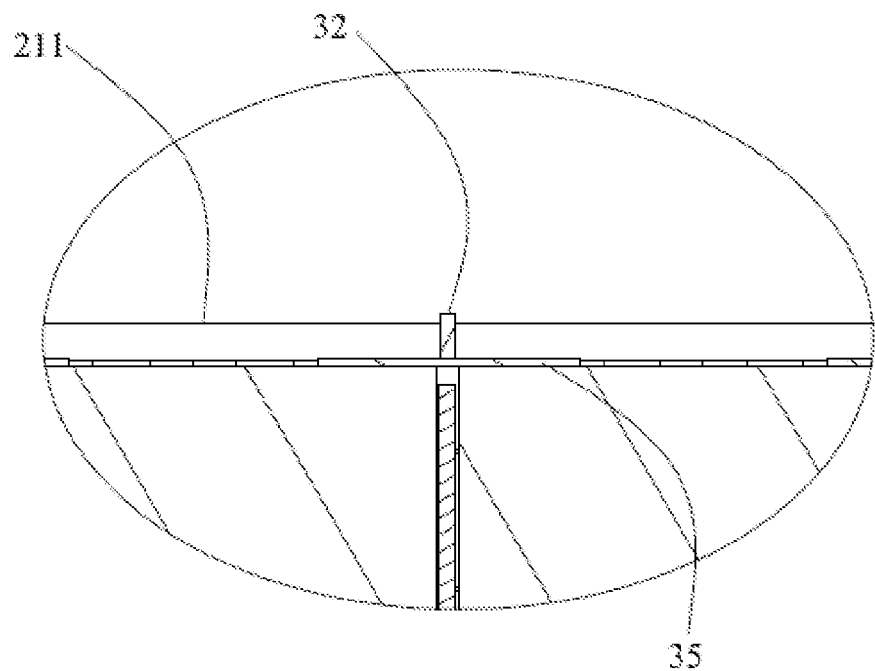
FIG. 6 is an enlarged view of a circle part in FIG. 5.

Referring to the examples shown in FIG. 5 and FIG. 6, in order to ensure that the obstructing block 32 effectively exerts the effect of blocking the heat exchange medium, a height of the obstructing block 32 in the height direction H of the battery back is not less than a height of the first heat exchange plate 211 and a height of the second heat exchange plate 212 in the height direction H of the battery pack. In some embodiments, the obstructing block 32 is protruded from the first heat exchange plate 211 and the second heat exchange plate 212 in a height direction H of the battery pack, so as to obstruct the heat exchange mediums leaking out from the heat exchange plate 21 from spreading to a position deviating from the thermal runaway when the battery 11 is subjected to thermal runaway, so that more heat exchange mediums flow into the open explosion-proof valve 111 and the thermal runaway of the battery is effectively prevented from spreading.

Figure 7:
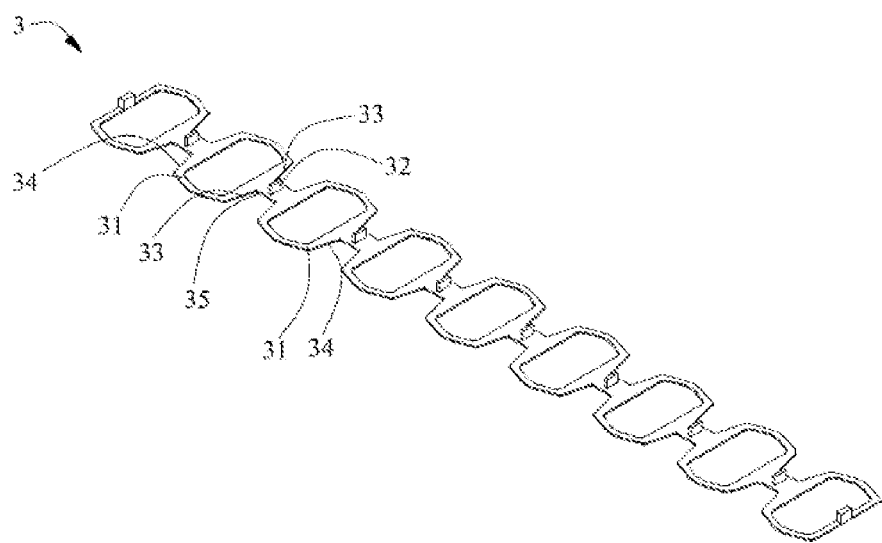
FIG. 7 is a stereogram of a flow guide piece of the battery pack according to FIG. 1.

Specifically, as shown in FIG. 7, the flow guide piece 3 may include a main body portion 34 and a connecting portion 35. There are a plurality of main body portions 34, and the connecting portion 35 is connected between two adjacent main body portions 34. The plurality main body portions 34 are arranged corresponding to the plurality batteries 11 respectively, and the plurality of positioning holes 31 are formed on the plurality of main body portions 34 respectively. The obstructing block 32 is arranged on the connecting portion 35.

Figure 8:
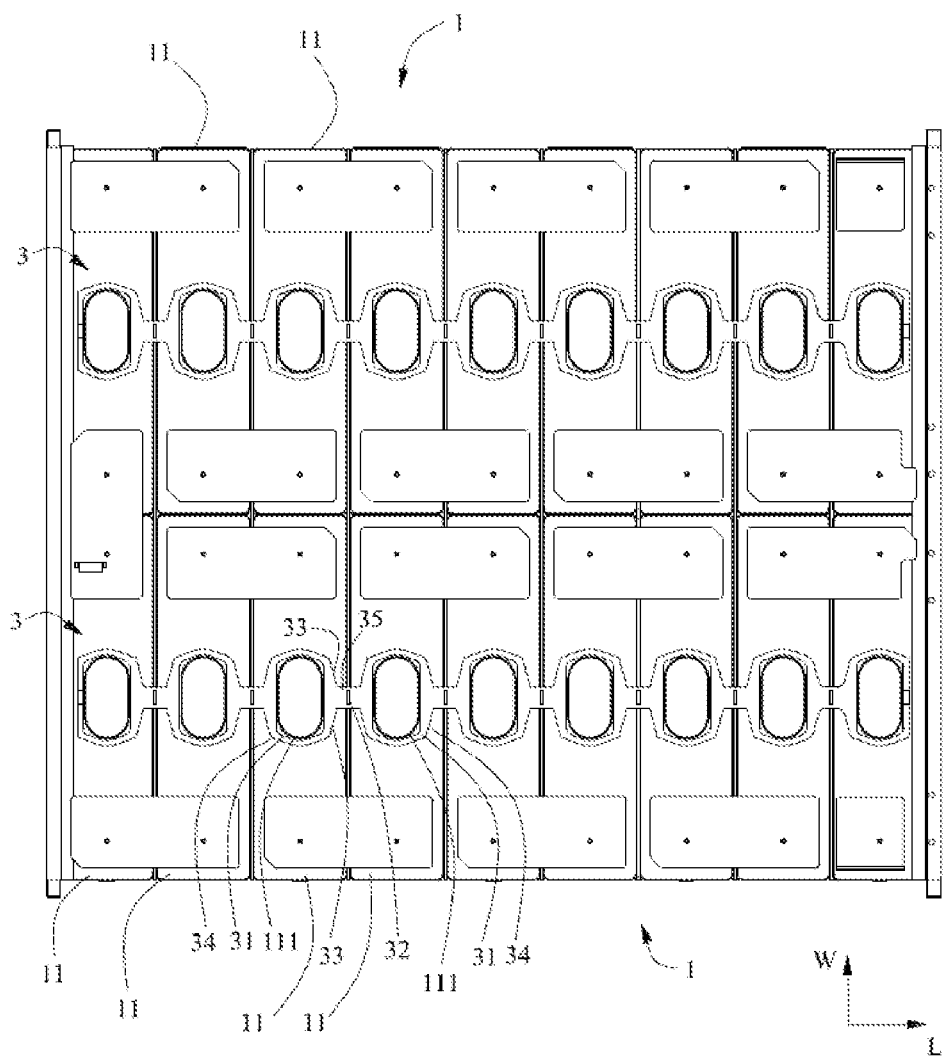
FIG. 8 is a planar graph that a flow guide piece of the battery pack according to FIG. 1 is arranged in a battery module.

Referring to FIG. 7 and FIG. 8, in some embodiments, the flow guide piece 3 is provided with a groove 33. The groove 33 is separated from the positioning hole 31. At least part of the heat-conducting connecting piece 4 is positioned in the groove 33. Specifically, the groove 33 is formed on an outer side of the connecting portion 35. The heat-conducting connecting piece 4 is a heat-conducting adhesive. The heat exchange plate 21 adheres to the battery 11 through the heat-conducting adhesive coating the top of the battery 11. After the flow guide piece 3 is mounted on the battery module 1, the top of the battery 11 is coated with the heat-conducting adhesive before the heat exchange plate 21 is mounted, then the heat exchange plate 21 is placed at the top of the battery 11, and the heat-conducting adhesive spreads into the groove 33 after being extruded by the heat exchange plate 21, so that the heat-conducting adhesive is prevented from gathering the explosion-proof valve 111 of the battery 11 after being extruded, the influence of the heat-conducting adhesive on the opening of the explosion-proof valve 111 during thermal runaway is further avoided, and the thermal runaway of the battery is effectively prevented from spreading. As shown in FIG. 7, a size of the groove 33 in the length direction L of the battery gradually decreases along a direction close to the connecting portion 35, so that the heat-conducting adhesive successfully enters the groove 33 after being extruded. Meanwhile, the contact area of the heat-conducting adhesive and the heat exchange plate 21 can be ensured, so that the connecting strength is improved.

Figure 9:
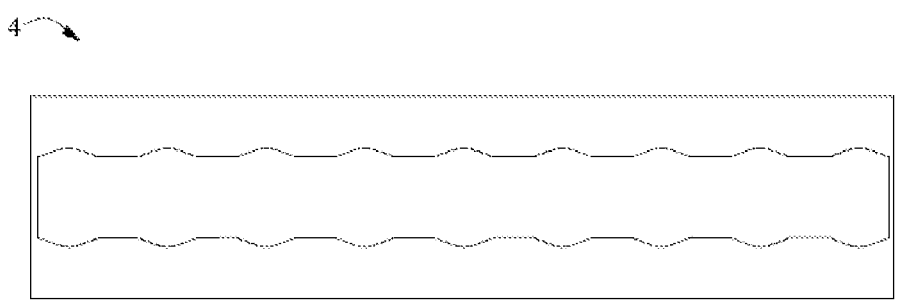
FIG. 9 is a schematic graph of a heat-conducting connecting piece of the battery pack according to FIG. 1.

Referring to FIG. 9 and FIG. 2, the heat-conducting connecting piece 4 may also be a heat-conducting rubber plate, the heat-conducting rubber plate is mounted at the top of the battery 11, the heat-conductive rubber plate is heated to adhere to a part between the top of the battery 11 and the heat exchange plate 21, and the heat-conducting rubber plate has high heat transfer efficiency, so that adhesion of the heat exchange plate 21 and the battery 11 is facilitated. As shown in FIG. 2, the heat exchange plate 21 is not shown. For convenience of description, only taking the case where the heat-conducting rubber plate at a certain position is heated and molten as an example, S represents a portion of the heat-conducting rubber plate at a certain position being heated and molten and spreading and extending into the groove 33 after being extruded by the heat exchange plate 21, and the groove 33 is filled with the spreading and extending portion S, so that the influence on the function of the explosion-proof valve 111 by the fact that the molten and excessively gathered colloid does not have a spreading space and spreads to the explosion-proof valve 111 is avoided. A shape of the heat-conducting rubber plate shown in FIG. 9 is only an example, and the shape of the heat-conducting rubber plate is not limited and may be determined according to the actual situation.

A plurality of exemplary embodiments are described above in detail, but the specification is not intended to be limited to the explicitly disclosed combination. Therefore, unless otherwise stated, various features disclosed herein may be combined together to form a plurality of additional combinations which are not shown for the sake of brevity.

The foregoing is merely illustrative of optional embodiments of the present application and is not intended to limit the present application. For those skilled in the art, the present application may have various modifications and changes. Any modifications, equivalent substitutions, improvements, and the like within the spirit and principles of the present application are intended to be included within the protection scope of the present application.

What is claimed is:

1. A battery pack, comprising a battery module, a heat exchange member, a flow guide piece and a heat-conducting connecting piece, wherein
    the battery module comprises a plurality of batteries, each battery being provided with an explosion-proof valve;
    the heat exchange member comprises a heat exchange plate, the heat exchange plate being connected to the plurality of batteries through the heat-conducting connecting piece, and the heat exchange plate at least partially covering each explosion-proof valve;
    the flow guide piece is arranged between the plurality of batteries and the heat exchange plate and is provided with a positioning hole penetrating along a height direction of the battery pack, the positioning hole exposing the corresponding explosion-proof valve;
    the flow guide piece separates the corresponding explosion-proof valve from the heat-conducting connecting piece;
    wherein the heat exchange plate is configured to be broken to release a heat exchange medium when any battery is subjected to thermal runaway, so that the heat exchange medium enters the battery through the explosion-proof valve to cool the battery;
    a plurality of positioning holes are provided, the plurality of positioning holes are arranged at intervals along a length direction of the battery pack, and each positioning hole corresponds to the respective explosion-proof valve;
    the heat exchange plate comprises a first heat exchange plate and a second heat exchange plate;
    the first heat exchange plate and the second heat exchange plate are arranged at intervals along a width direction of the battery pack, and each explosion-proof valve is covered with the first heat exchange plate and the second heat exchange plate at the same time;
    the flow guide piece is provided with an obstructing block, the obstructing block is arranged between two adjacent positioning holes, and the obstructing block is positioned between the first heat exchange plate and the second heat exchange plate.

2. The battery pack according to claim 1, wherein a height of the obstructing block in the height direction of the battery pack is not less than a height of the first heat exchange plate and a height of the second heat exchange plate the height direction of the battery pack.

3. The battery pack according to claim 2, wherein the obstructing block is protruded from the first heat exchange plate and the second heat exchange plate in the height direction of the battery pack.

4. The battery pack according to claim 1, wherein the obstructing block abuts against a side wall of the first heat exchange plate and a side wall of the second heat exchange plate.

5. The battery pack according to claim 1, wherein the flow guide piece is provided with a groove, the groove is separated from the positioning hole, and at least part of the heat-conducting connecting piece is positioned in the groove.

6. The battery pack according to claim 5, wherein the flow guide piece comprises a main body portion and a connecting portion;
    a plurality of main body portions are provided, and the connecting portion is connected between two adjacent main body portions;
    the plurality of main body portions are arranged corresponding to the plurality of batteries respectively, and the plurality of positioning holes are provided on the plurality of main body portions respectively;
    the obstructing block is arranged on the connecting portion.

7. The battery pack according to claim 6, wherein the groove is formed on an outer side of the connecting portion.

8. The battery pack according to claim 7, wherein a size of the groove in a length direction of the battery pack gradually decreases along a direction closed to the connecting portion.

9. The battery pack according to claim 1, wherein the heat-conducting connecting piece is a heat-conducting rubber plate.

10. The battery pack according to claim 1, wherein the heat-conducting connecting piece is a heat-conducting adhesive, and the heat exchange plate is configured to adhere to the plurality of batteries through the heat-conducting adhesive coating a top of the plurality of batteries.

11. The battery pack according to claim 1, wherein a size of the positioning hole is not less than a size of the explosion-proof valve.

12. The battery pack according to claim 1, wherein the flow guide piece is configured to adhere to the plurality of batteries by adhesive.

13. A device, comprising:
    a battery pack, comprising a battery module, a heat exchange member, a flow guide piece and a heat-conducting connecting piece, wherein
    the battery module comprises a plurality of batteries, each battery being provided with an explosion-proof valve;
    the heat exchange member comprises a heat exchange plate, the heat exchange plate being connected to the plurality of batteries through the heat-conducting connecting piece, and the heat exchange plate at least partially covering each explosion-proof valve;

the flow guide piece is arranged between the plurality of batteries and the heat exchange plate and is provided with a positioning hole penetrating along a height direction of the battery pack, the positioning hole exposing the corresponding explosion-proof valve;

the flow guide piece separates the corresponding explosion-proof valve from the heat-conducting connecting piece;

wherein the battery pack is configured to provide electric energy;

wherein the heat exchange plate is configured to be broken to release a heat exchange medium when any battery is subjected to thermal runaway, so that the heat exchange medium enters the battery through the explosion-proof valve to cool the battery;

a plurality of positioning holes are provided, the plurality of positioning holes are arranged at intervals along a length direction of the battery pack, and each positioning hole corresponds to the respective explosion-proof valve;

the heat exchange plate comprises a first heat exchange plate and a second heat exchange plate;

the first heat exchange plate and the second heat exchange plate are arranged at intervals along a width direction of the battery pack, and each explosion-proof valve is covered with the first heat exchange plate and the second heat exchange plate at the same time;

the flow guide piece is provided with an obstructing block, the obstructing block is arranged between two adjacent positioning holes, and the obstructing block is positioned between the first heat exchange plate and the second heat exchange plate.

14. The device according to claim 13, wherein the obstructing block abuts against a side wall of the first heat exchange plate and a side wall of the second heat exchange plate.

* * * * *